US012661603B2

(12) United States Patent
Zhao et al.

(10) Patent No.: US 12,661,603 B2
(45) Date of Patent: Jun. 23, 2026

(54) SYSTEM AND METHOD FOR IMPROVING WATER QUALITY OF DEHYDRATION TOWER IN PURIFIED TEREPHTHALIC ACID DEVICE

(71) Applicant: TIANHUA INSTITUTE OF CHEMICAL MACHINERY AND AUTOMATION CO., LTD, Lanzhou (CN)

(72) Inventors: Xu Zhao, Lanzhou (CN); Yongpeng Tan, Lanzhou (CN); Yan Gao, Lanzhou (CN); Kaixuan Ma, Lanzhou (CN); Yipeng Zhang, Lanzhou (CN); Yuanrui Lu, Lanzhou (CN); Xiangnan Zhai, Lanzhou (CN); Tao Zhou, Lanzhou (CN); Xiaoling Xie, Lanzhou (CN)

(73) Assignee: TIANHUA INSTITUTE OF CHEMICAL MACHINERY AND AUTOMATION CO., LTD, Lanzhou (CN)

( * ) Notice: Subject to any disclaimer, the term of this patent is extended or adjusted under 35 U.S.C. 154(b) by 344 days.

(21) Appl. No.: 18/260,294

(22) PCT Filed: May 16, 2022

(86) PCT No.: PCT/CN2022/092909
§ 371 (c)(1),
(2) Date: Jul. 3, 2023

(87) PCT Pub. No.: WO2023/103283
PCT Pub. Date: Jun. 15, 2023

(65) Prior Publication Data
US 2024/0050873 A1 Feb. 15, 2024

(30) Foreign Application Priority Data
Dec. 7, 2021 (CN) .......................... 202111483557.1

(51) Int. Cl.
*B01D 1/26* (2006.01)
*B01D 5/00* (2006.01)
(Continued)

(52) U.S. Cl.
CPC ............. *B01D 1/26* (2013.01); *B01D 5/0036* (2013.01); *B01D 5/0039* (2013.01);
(Continued)

(58) Field of Classification Search
None
See application file for complete search history.

(56) References Cited

U.S. PATENT DOCUMENTS

2008/0097118 A1* 4/2008 Bartos .................... B01D 3/009
562/408

FOREIGN PATENT DOCUMENTS

| CN | 1951900 A | 4/2007 |
| CN | 101384332 A | 3/2009 |

(Continued)

OTHER PUBLICATIONS

KR100744754B1—preview (IP.com machine translation of Park) (Year: 2007).*

*Primary Examiner* — Gabriel E Gitman
(74) *Attorney, Agent, or Firm* — MUNCY, GEISSLER, OLDS & LOWE, P.C.

(57) ABSTRACT

A system and method for improving the water quality of a dehydration tower in a purified terephthalic acid device includes a dehydration washing device, a tail gas condensation device communicating with the top of the dehydration washing device, and a water separation device communicating with the tail gas condensation device. The system reduces energy consumption. The tail gas condensation device uses low-pressure vapor of about 0.05 MPa generated by an $N_m$-th-stage condenser as a heating medium. Working (Continued)

media are water and the low-pressure vapor, and no organic phase is involved in a process, and a reaction is stable and intrinsically safe. The water in the water separation tower is purified water and concentrated water, the purified water is returned to the top of the dehydration tower, and the concentrated water is mixed with a mother liquor and then enters the dehydration tower.

8 Claims, 2 Drawing Sheets

(51) Int. Cl.

| | | |
|---|---|---|
| *B01D 53/14* | (2006.01) | |
| *B01D 53/18* | (2006.01) | |
| *C02F 1/04* | (2023.01) | |
| *C02F 1/16* | (2023.01) | |
| *F28B 7/00* | (2006.01) | |
| *C02F 103/36* | (2006.01) | |

(52) U.S. Cl.
CPC ........... *B01D 5/0054* (2013.01); *B01D 5/006* (2013.01); *B01D 53/1406* (2013.01); *B01D 53/1456* (2013.01); *B01D 53/1487* (2013.01); *B01D 53/18* (2013.01); *C02F 1/048* (2013.01); *C02F 1/16* (2013.01); *F28B 7/00* (2013.01); *B01D 2252/103* (2013.01); *B01D 2252/20* (2013.01); *C02F 2103/36* (2013.01); *C02F 2301/08* (2013.01); *C02F 2303/10* (2013.01)

(56) References Cited

FOREIGN PATENT DOCUMENTS

| | | | |
|---|---|---|---|
| CN | 101537299 A | 9/2009 | |
| CN | 106115825 A | 11/2016 | |
| CN | 112807722 A | 5/2021 | |
| CN | 114057252 A | 2/2022 | |
| CN | 216808188 U | 6/2022 | |
| JP | H11-349530 A | 12/1999 | |
| KR | 100744754 B1 * | 8/2007 | ............ C07C 63/26 |

* cited by examiner

SYSTEM AND METHOD FOR IMPROVING WATER QUALITY OF DEHYDRATION TOWER IN PURIFIED TEREPHTHALIC ACID DEVICE

TECHNICAL FIELD

The present disclosure relates to a treatment method for improving the water quality of a dehydration tower in a purified terephthalic acid device, in particular to a system and process method for purifying and utilizing a condensed liquid of oxidized tail gas during the industrial production of PTA.

BACKGROUND

During the preparation and production of purified terephthalic acid (PTA), a condensed liquid of tail gas will be produced. At present, the condensed liquid of the tail gas is purified generally by extraction: a refined mother liquor (condensed liquid) of a PTA refining unit is heated with medium-pressure vapor and then enters an extraction tower together with an extractant, namely, p-xylene (PX for short, hereinafter referred to as PX) to be extracted, and the extractant PX extracts solutes (organic components such as acetic acid, p-toluic (PT) acid and the like) in an original solvent into the PX to form a PX extraction phase, wherein the PX extraction phase is returned to an oxidation reactor to continue to react, a raffinate phase (the refined mother liquor after separation of the acetic acid, the PT acid and other organic components in the original solvent) is rectified by a traditional dehydration tower to exchange water with the acetic acid, acetic acid vapor is condensed into a condensed liquid of the acetic acid to be returned to the reactor from the bottom of the dehydration tower to continue to react, the water is vaporized into water vapor to be discharged from the top of the dehydration tower together with oxidized tail gas into a condenser for heat recovery, and the water vapor is condensed into condensed water for other purposes. But some problems exist in the above-mentioned method: 1, the adoption of the PX extraction technology leads to a complicated extraction process and huge system and investment; 2, during the extraction of the refined mother liquor as an original solution, in order to prevent the clogging of the extraction tower, the mother liquor needs to be heated with a huge amount of the medium-pressure vapor of 3.5-4.5 MPa (G), and the medium-pressure vapor needs to be provided from the outside, so that the energy consumption and operating cost of a device are greatly increased; and 3, the extraction process is a mass transfer process of a PX organic phase and a water phase, and with the existence of the organic phase, the system safety requirements are higher than the requirements of the water phase, so that the construction cost is increased.

SUMMARY

An objective of the present disclosure is to provide a system and a process for improving the water quality of a dehydration tower in a purified terephthalic acid device. Through the system and the corresponding process, a purification or enrichment effect is achieved.

Provided is a treatment system for improving the water quality of a dehydration tower in a purified terephthalic acid device, the system including a dehydration washing device, a tail gas condensation device communicating with the top of the dehydration washing device, and a water separation device communicating with the tail gas condensation device, wherein the dehydration washing device comprises a first-stage purified water washing unit located at the top of the dehydration washing device, a second-stage concentrated water washing unit located in the middle of the dehydration washing device, and/or a third-stage refined mother liquor washing unit located at a lower portion of the dehydration washing device;

the tail gas condensation device is connected with a first high-temperature condensed liquid tank for containing a first condensed liquid obtained after first heat exchange by oxidized tail gas condensers in the system, a second condensed liquid tank for containing a second condensed liquid obtained after second heat exchange, and a second vapor channel for exporting vapor; and specifically, the tail gas condensation device includes a first oxidized tail gas condensation system including one or more stages of oxidized tail gas condensers that communicate in sequence and a second oxidized tail gas condensation system located after the first oxidized tail gas condensation system and including one or more stages of oxidized tail gas condensers that communicate in sequence, each stage of the oxidized tail gas condenser in the first oxidized tail gas condensation system communicates to the first high-temperature condensed liquid tank for containing the first condensed liquid obtained after the heat exchange by the oxidized tail gas condensers in the system, and each stage of the oxidized tail gas condenser in the second oxidized tail gas condensation system communicates to the second condensed liquid tank for containing the second condensed liquid obtained after the heat exchange by the oxidized tail gas condensers in the system and the second vapor channel for exporting the vapor, wherein the oxidized tail gas condenser disposed at a tail end is provided with a tail gas discharge outlet; and the water separation device includes multi-effect evaporation units for purifying and separating the second condensed liquid, as well as a purified water outlet and a concentrated water outlet after separation and purification, the purified water outlet communicates to the first-stage purified water washing unit through a purified water pipeline, the second condensed liquid tank communicates to the bottom of a first-effect evaporation unit through a second condensed liquid pipeline to separate the condensed liquid, and the second vapor channel extends into the first-effect evaporation unit through a second vapor pipeline to provide a heat source for heat exchange during the separation of the condensed liquid: the concentrated water outlet communicates to the second-stage concentrated water washing unit through a concentrated water pipeline; and a purified water heat exchanger is disposed on the purified water pipeline, the first high-temperature condensed liquid tank conducts heat exchange by the purified water heat exchanger through a high-temperature condensed liquid pipeline, a concentrated water heat exchanger is disposed on the concentrated water pipeline, and the first high-temperature condensed liquid tank conducts heat exchange by the concentrated water heat exchanger through a second high-temperature condensed liquid pipeline.

Further, the dehydration washing device is a dehydration washing tower, the bottom of the dehydration washing tower communicates with a PTA oxidation reactor, and a concentrated reaction liquid after washing is returned to the oxidation reactor to continue to react, wherein a circulating pump may be used.

Further, the first-stage purified water washing unit, the second-stage concentrated water washing unit and the third-stage refined mother liquor washing unit are respectively provided with spray heads to wash tail gas by spraying.

Further, the first oxidized tail gas condensation system includes 1-4, preferably 3 stages of oxidized tail gas condensers, Further, the second oxidized tail gas condensation system includes 1-4, preferably 3 stages of oxidized tail gas condensers.

Further, the water separation device is a water separation tower, evaporation units for purifying condensed water are disposed in a tower body, a final-effect condensation unit is disposed below the evaporation units, and a vacuum pump is connected to the bottom of the final-effect condensation unit. The water separation tower may be a water separation tower based on falling film evaporation or rising film evaporation.

Preferably, the evaporation units include a first-effect evaporation unit and a second-effect evaporation unit, the first-effect evaporation unit includes a second condensed liquid inlet and a first heat exchange chamber, an upper portion of the first heat exchange chamber is connected with a first vapor passage for a vapor phase to enter a next effect evaporation unit and a first downcomer for a liquid phase to flow to a next effect evaporation unit, and the bottom of the first downcomer is provided with a first concentric-square-shaped device: the second-effect evaporation unit includes a second heat exchange chamber, an upper portion of the second heat exchange chamber is provided with a second vapor passage for a vapor phase to pass through after heat exchange of the condensed water and a second downcomer for a liquid phase to pass through, and the bottom of the second downcomer is provided with a second concentric-square-shaped device: a lower portion of the second heat exchange chamber is provided with a first condensed liquid channel for the condensed liquid to flow to the next effect evaporation unit after heat exchange, and the bottom of the first condensed liquid channel is provided with a first U-shaped tube; and the first concentric-square-shaped device is located between the second heat exchange chamber and a second demister.

Provided is a method for improving the water quality of a dehydration tower in a purified terephthalic acid device, the method including the following steps:

1) introducing, after reaction tail gas comes out from the bottom of an oxidation reactor, the reaction tail gas into a lower portion of a third-stage refined mother liquor washing unit, and during the rising, enabling the reaction tail gas to firstly pass through the third-stage refined mother liquor washing unit to be subjected to spray washing with a refined mother liquor, then pass through a second-stage concentrated water washing unit to be subjected to spray washing with concentrated water and finally pass through a first-stage purified water washing unit to be subjected to spray washing with purified water;

2) enabling, after the reaction tail gas washed with the dehydration tower comes out from the top of a tail gas condensation device 2, the reaction tail gas to firstly enter a first-stage oxidized tail gas condenser and then enter other oxidized tail gas condensers backwards in sequence to exchange heat for cooling, wherein a part of the tail gas will become a condensed liquid, namely, a first condensed liquid, and the first condensed liquid produced by each stage of oxidized tail gas condenser will flow into a first high-temperature condensed liquid tank through a pipeline; and after the reaction tail gas is condensed through a first oxidized tail gas condensation system, enabling the reaction tail gas to enter a second oxidized tail gas condensation system to continue to be condensed, so as to form a second condensed liquid through the condensation treatment of the first oxidized tail gas condensation system, then enabling the second condensed liquid to enter a second condensed liquid tank through a pipeline, and discharging second vapor that is not condensed upwards;

3) enabling the second condensed liquid to enter a water separation tower to be continuously separated and purified: turning on a vacuum pump located at the bottom, enabling the second condensed liquid to enter a first heat exchange chamber from a second condensed liquid inlet to be evaporated, enabling the second vapor to enter a pipeline in the first heat exchange chamber from a second vapor pipeline, enabling the second vapor and the second condensed liquid to exchange heat in the first heat exchange chamber, enabling a part of the second condensed liquid to be volatilized and enter a first vapor passage upwards, enabling the vapor entering a pipeline in a second-effect evaporation unit through the first vapor passage to continue to be used as a heat source to exchange heat with a condensed liquid flowing out of a first downcomer, enabling heat of the vapor to flow to the condensed liquid, finally enabling the vapor to be cooled and flow out of a first condensed liquid channel, and enabling a part of the condensed liquid to be gathered in a first U-shaped tube and finally flow to a purified water storage area at the bottom; and enabling a part of the condensed liquid that is not evaporated to enter the first downcomer and then enter a next effect evaporation unit to continue to be evaporated or stay at a first concentric-square-shaped device; and 4) after separation, discharging the purified water from a purified water outlet through a pipeline, exchanging heat with a first high-temperature condensed liquid through a purified water heat exchanger to increase the temperature of the purified water, and then spraying the reaction tail gas with the purified water as a washing liquid of the first-stage purified water washing unit; and discharging the concentrated water from a concentrated water outlet through a pipeline, and performing spray washing on the reaction tail gas with the concentrated water as a washing liquid of the second-stage concentrated water washing unit through a concentrated water heat exchanger.

The present disclosure has the following beneficial effects: 1) in the present disclosure, an extraction technology is replaced with a water separation tower technology, which saves medium-pressure vapor required for extraction, reduces the consumption of external vapor per ton of product by about 0.2 tons or above, greatly reduces the energy consumption, and achieves the remarkable economic benefit: 2) the tail gas condensation device only needs to use low-pressure vapor of about 0.05 MPa (G) produced by an $N_m$-th-stage condenser (one or more stages in $N_{i+1}$-th to N-th-stage condensers) as a heating medium, which may greatly reduce low-grade vapor entering a steam turbine of an air compressor system and reduce the burden on an air compressor (a four-in-one unit); and in addition, the difficulty of designing and manufacturing an air compressor unit is lowered, the manufacturing cost is greatly reduced, and the loss of a cold source in the four-in-one unit and the amount of circulating cooling water are reduced: 3) the water separation tower is a tower-type multi-effect evaporation water separation tower, working media are water and the low-pressure vapor, and no organic phase is involved in a process, so that a reaction is stable and intrinsically safe: 4) the water in the water separation tower is purified water and concentrated water, the purified water is returned to the top of the dehydration tower, and the concentrated water is mixed with a mother liquor and then enters the dehydration tower, thereby greatly raising the efficiency of the dehydration tower and improving the water quality; and 5) the system is simplified, with less investment.

DETAILED DESCRIPTION OF THE EMBODIMENTS

The present disclosure is further explained and described below with reference to the accompanying drawings.

Figure 1:
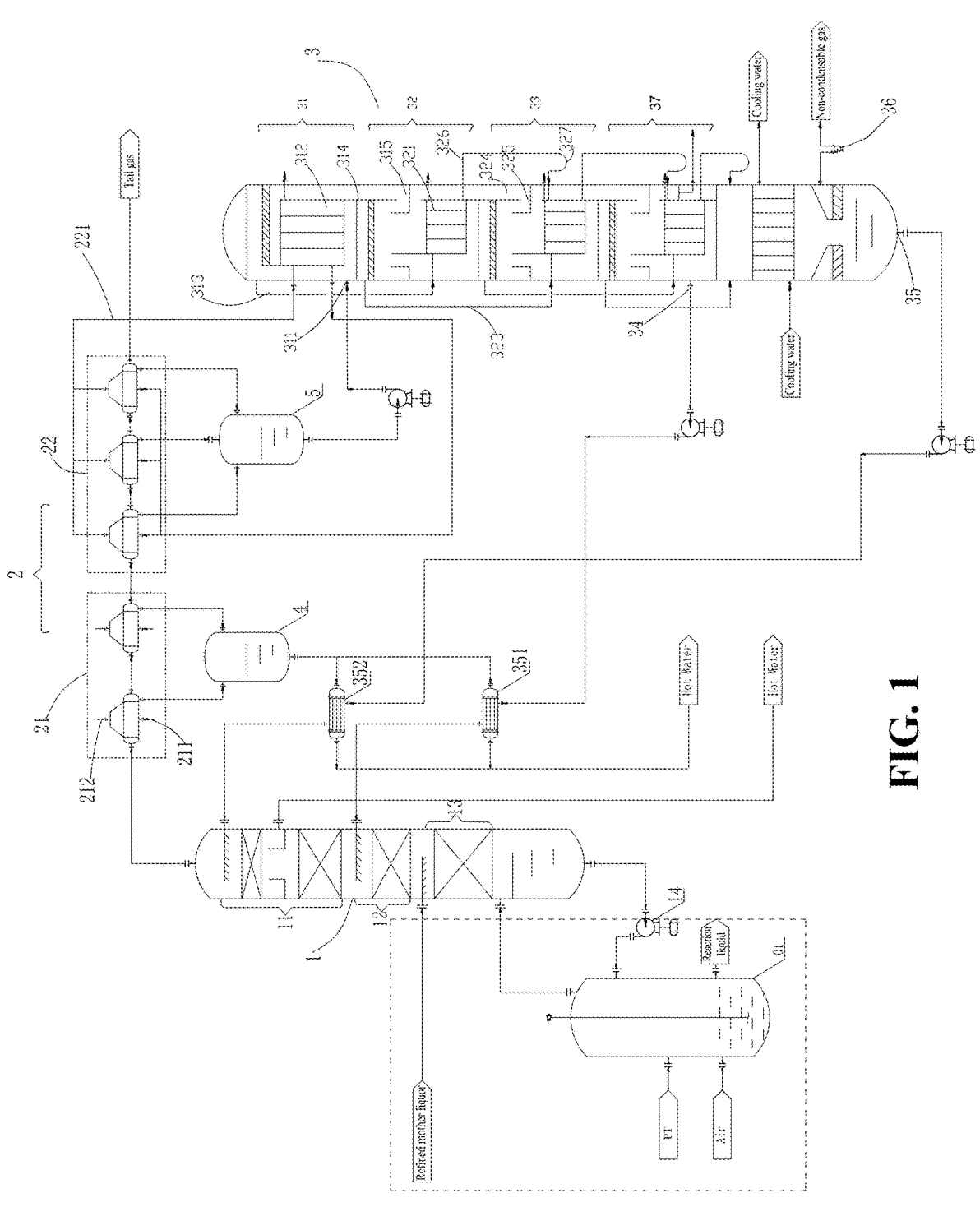
FIG. 1 is a flowchart of a PTA short-flow process for purifying condensed water according to the present disclosure.
Figure 2:
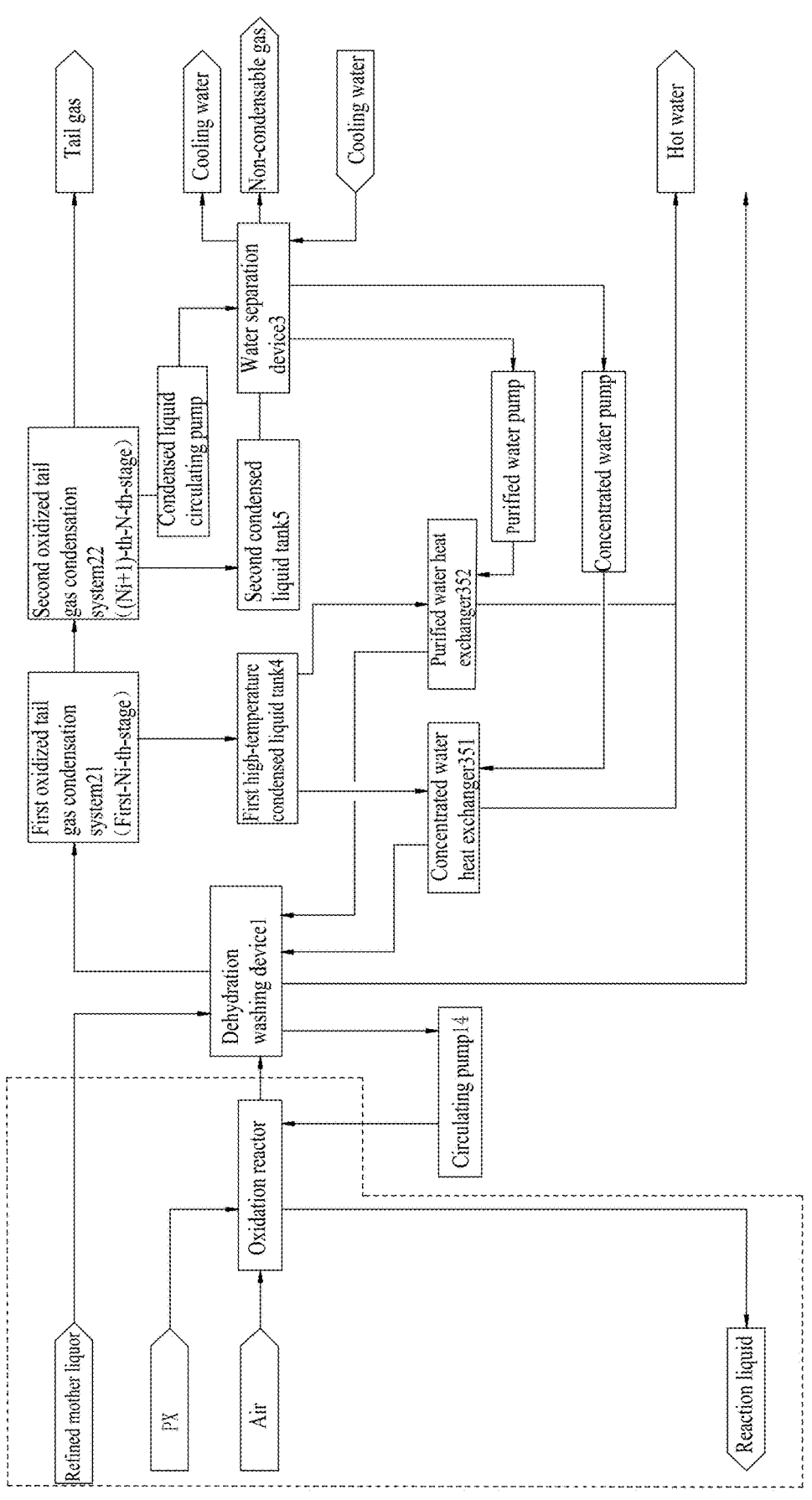
FIG. 2 is a block diagram of the PTA short-flow process for purifying the condensed water according to the present disclosure.

Referring to FIG. 1, a dotted box shows an oxidation reactor (01) for producing PTA. PT and air are introduced into the oxidation reactor (01) in which there are acetic acid and the like, a reaction is performed to obtain a reaction liquid, and the reaction liquid is subjected to procedures of washing and the like to obtain a reactant and a refined mother liquor. The refined mother liquor contains a large amount of organic components such as the acetic acid, PT acid and the like, so that in a treatment system provided by the present disclosure, the refined mother liquor is used as a spraying liquid of a third-stage refined mother liquor washing unit. In addition, since the reaction is an exothermic reaction, a large amount of heat energy will be released during the reaction, and a part (reaction tail gas) of the reaction liquid will be evaporated upwards to go out from a pipeline. One of the objectives of the present disclosure is to enrich the reaction tail gas, then change it to be in a liquid form and return it to the oxidation reactor (01).

Provided is a treatment system for improving the water quality of a dehydration tower in a purified terephthalic acid device, the system including a dehydration washing device 1, a tail gas condensation device 2 communicating with the top of the dehydration washing device 1 and a water separation device 3 communicating with the tail gas condensation device 2.

The dehydration washing device 1 includes a first-stage purified water washing unit 11 located at the top of the dehydration washing device, a second-stage concentrated water washing unit 12 located in the middle of the dehydration washing device and a third-stage refined mother liquor washing unit 13 located at a lower portion of the dehydration washing device, and each of the units is washed by spraying.

After coming out from the bottom of the oxidation reactor (01), the reaction tail gas is introduced into the dehydration washing device 1, and an introduction inlet is formed in a lower portion of the third-stage refined mother liquor washing unit 13. During the rising, the reaction tail gas firstly passes through the third-stage refined mother liquor washing unit 13 to be subjected to spray washing with the refined mother liquor, then passes through the second-stage concentrated water washing unit 12 to be subjected to spray washing with concentrated water, and finally passes through the first-stage purified water washing unit 11 to be subjected to spray washing with purified water. After three times of spray washing, most of the organic components such as the acetic acid, the PT acid and the like in the reaction tail gas are enriched at the bottom of the dehydration washing device 1, this part of enriched liquid is returned to the oxidation reactor (01) again under the action of a circulating pump 14 to continue to react, and the reaction tail gas containing a small part of the organic components such as the acetic acid, the PT acid and the like after washing is discharged from the top of the dehydration washing device 1 and enters a next process for other treatments.

Preferably, the dehydration washing device is a dehydration washing tower, the bottom of the dehydration washing tower communicates with the PTA oxidation reactor, and a concentrated reaction liquid (in which a large amount of the organic components such as the acetic acid, the PT acid and the like are enriched) after washing is returned to the oxidation reactor to continue to react, wherein the circulating pump may be used 14.

The tail gas condensation device 2 includes a first oxidized tail gas condensation system 21 including one or more stages of oxidized tail gas condensers that communicate in sequence and a second oxidized tail gas condensation system 22 located after the first oxidized tail gas condensation system 21 and including one or more stages of oxidized tail gas condensers that communicate in sequence, each stage of the oxidized tail gas condenser in the first oxidized tail gas condensation system 21 communicates to a first high-temperature condensed liquid tank 4 for containing a first condensed liquid obtained after heat exchange by the oxidized tail gas condensers in the system, and each stage of the oxidized tail gas condenser in the second oxidized tail gas condensation system 22 communicates to a second condensed liquid tank 5 for containing a second condensed liquid obtained after heat exchange by the oxidized tail gas condensers in the system and a second vapor channel for exporting vapor, wherein the oxidized tail gas condenser disposed at a tail end is provided with a tail gas discharge outlet.

The first oxidized tail gas condensation system 21 includes 1–N, preferably 3 stages of oxidized tail gas condensers. FIG. 1 shows two stages of oxidized tail gas condensers. Each stage of oxidized tail gas condenser is provided with a cold water inlet 211 and a hot water outlet 212.

In FIG. 1, after coming out from the top of the tail gas condensation device 2, reaction tail gas washed with the dehydration tower firstly enters a first-stage oxidized tail gas condenser and then enters other oxidized tail gas condensers backwards in sequence. In the process of flowing through these oxidized tail gas condensers, the reaction tail gas will exchange heat with cold water flowing in from the cold water inlet 211. After heat exchange, the cold water is heated, and the reaction tail gas in the oxidized tail gas condensers will be cooled, so that a part of the reaction tail gas will become a condensed liquid, namely, a first condensed liquid. The first condensed liquid produced by each stage of oxidized tail gas condenser will flow into the first high-temperature condensed liquid tank 4 through a pipeline. After being condensed through the first oxidized tail gas condensation system 21, the reaction tail gas enters the second oxidized tail gas condensation system 22 to continue to be condensed, and through the condensation treatment of the first oxidized tail gas condensation system 21, the temperature of the reaction tail gas and the pressure are reduced.

The second oxidized tail gas condensation system 22 includes 1-4, preferably 3 stages of oxidized tail gas condensers. FIG. 1 shows three stages of oxidized tail gas condensers. The cold water is not used to exchange heat for each oxidized tail gas condenser in the second oxidized tail gas condensation system 22. During the natural flow, a part of the reaction tail gas is naturally condensed into the second condensed liquid and then enters the second condensed liquid tank 5 through a pipeline, and the reaction tail gas (second vapor) that is not condensed is discharged upwards.

The water separation device 3 includes multi-effect evaporation units (31, 32, 33 . . . ) for purifying and separating the second condensed liquid, as well as a purified water outlet 35 and a concentrated water outlet 34 after separation and purification, the purified water outlet 35 communicates to the first-stage purified water washing unit 11 through a purified water pipeline, the second condensed liquid tank 5 communicates to the bottom of a first-effect evaporation unit through a second condensed liquid pipeline to separate the condensed liquid, and the second vapor channel extends into the first-effect evaporation unit through a second vapor pipeline 221 to provide a heat source for heat exchange during the separation of the condensed liquid; the concentrated water outlet 34 communicates to the second-stage concentrated water washing unit 12 through a concentrated water pipeline; and a purified water heat exchanger 352 is disposed on the purified water pipeline, the first high-temperature condensed liquid tank 4 conducts heat exchange by the purified water heat exchanger 352 through a high-temperature condensed liquid pipeline, a concentrated water heat exchanger 351 is disposed on the concentrated water pipeline, and the first high-temperature condensed liquid tank 4 conducts heat exchange by the concentrated water heat exchanger 351 through a high-temperature condensed liquid pipeline.

Preferably, the water separation device is a closed water separation tower, the evaporation units (31, 32, 33 . . . ) for purifying condensed water are disposed in a tower body, a final-effect condensation unit 37 is disposed below the evaporation units, and a vacuum pump is connected to the bottom of the final-effect condensation unit 37. As shown in FIG. 1, the evaporation units include a first-effect evaporation unit 31 and a second-effect evaporation unit 32, the first-effect evaporation unit 31 includes a second condensed liquid inlet 311 and a first heat exchange chamber 312, the second condensed liquid inlet 311 is located at the bottom of the first-effect evaporation unit 31, the second vapor pipeline 221 introduces the second vapor to the first heat exchange chamber 312 to provide the heat source for heat exchange, the second condensed liquid exchanges heat with the second vapor in the first heat exchange chamber 312, and a part of the second condensed liquid is gasified to separate water from other organic matter: an upper portion of the first heat exchange chamber 312 is connected with a first vapor passage 313 for a vapor phase to enter a next effect evaporation unit and a first downcomer 314 for a liquid phase to flow to a next effect evaporation unit, and the bottom of the first downcomer 314 is provided with a first concentric-square-shaped device 315: the second-effect evaporation unit 32 includes a second heat exchange chamber 321, an upper portion of the second heat exchange chamber 321 is provided with a second vapor passage 323 for a vapor phase to pass through after heat exchange of the condensed water and a second downcomer 324 for a liquid phase to pass through, and the bottom of the second downcomer 324 is provided with a second concentric-square-shaped device 325: a lower portion of the second heat exchange chamber 32 is provided with a first condensed liquid channel 326 for the condensed liquid to flow to the next effect evaporation unit after heat exchange, and the bottom of the first condensed liquid channel 326 is provided with a first U-shaped tube 327; and the first concentric-square-shaped device 325 is located between the second heat exchange chamber and a second demister. Vapor of 0.05 MPa (G) is recommended as the vapor entering the water separation tower, which may also be vapor of 0.05-0.5 MPa (G) produced by any stage of oxidized tail gas condenser or vapor introduced from outside.

In the water separation tower, the second condensed liquid is continuously separated and purified. The vacuum pump 36 located at the bottom is turned on, the second condensed liquid enters the first heat exchange chamber 312 from the second condensed liquid inlet 311 to be evaporated, and the second vapor enters a pipeline in the first heat exchange chamber 312 from the second vapor pipeline 221. The second vapor and the second condensed liquid exchange heat in the first heat exchange chamber 312. A part of the second condensed liquid is volatilized and enters the first vapor passage 313 upwards, and a part of the condensed liquid that is not evaporated enters the first downcomer 314 and then enter the next effect evaporation unit to continue to be evaporated or stay at the first concentric-square-shaped device 315. The vapor entering a pipeline in the second-effect evaporation unit 32 through the first vapor passage 313 continues to be used as a heat source to exchange heat with a condensed liquid flowing out of the first downcomer 314, heat of the vapor flows to the condensed liquid, finally the vapor is cooled and flows out of the first condensed liquid channel 326, and a part of the condensed liquid is gathered in the first U-shaped tube 327 and finally flows to a purified water storage area at the bottom. The first concentric-square-shaped device 315 and the first U-shaped tube 327 isolate the effect evaporation units, and in this way, under the action of the vacuum pump 26, the pressure gradually decreases from top to bottom, so that the first concentric-square-shaped device 315 will also perform spontaneous evaporation under the action of a pressure difference and heat exchange to separate water from other substances. After separation, the purified water is discharged from the purified water outlet 35 through a pipeline, exchanges heat with a first high-temperature condensed liquid through the purified water heat exchanger 352 to be heated, and then sprays the reaction tail gas as a washing liquid of the first-stage purified water washing unit; and the concentrated water is discharged from the concentrated water outlet 34 through a pipeline, and performs spray washing on the reaction tail gas as a washing liquid of the second-stage concentrated water washing unit through the concentrated water heat exchanger 351. The concentrated water produced by the novel water separation tower may enter the dehydration tower, and may also be used as a washing liquid of a crude terephthalic acid (CTA for short, hereinafter referred to as CTA) solvent exchange unit.

In the whole system, as shown in the figures, various types of pumps or valves will be installed reasonably according to the actual needs to achieve the smoothness of the system.

The invention claimed is:

1. A treatment system for improving the water quality of a dehydration tower in a purified terephthalic acid device, the system comprising a dehydration washing device, a tail gas condensation device communicating with a top of the dehydration washing device, and a water separation device communicating with the tail gas condensation device, wherein:

the dehydration washing device comprises a first-stage purified water washing unit located at the top of the dehydration washing device, a second-stage concentrated water washing unit located in the middle of the dehydration washing device, and/or a third-stage refined mother liquor washing unit located at a lower portion of the dehydration washing device;

the tail gas condensation device comprises oxidized tail gas condensers;

the tail gas condensation device is connected with a first high-temperature condensed liquid tank for containing a first condensed liquid obtained after a first heat exchange by the oxidized tail gas condensers in the system, a second condensed liquid tank for containing a second condensed liquid obtained after a second heat exchange, and a second vapor channel for exporting vapor; and the water separation device comprises multi-effect evaporation units for purifying and separating the second condensed liquid, as well as a purified water outlet and a concentrated water outlet, wherein the multi-effect evaporation units comprise a first-effect evaporation unit and a second-effect evaporation unit, the purified water outlet communicates to the first-stage purified water washing unit through a purified water pipeline, the second condensed liquid tank communicates to the bottom of the first-effect evaporation unit through a second condensed liquid pipeline to separate the second condensed liquid, and the second vapor channel extends into the first-effect evaporation unit through a second vapor pipeline to provide a heat source for heat exchange during the separation of the second condensed liquid;

the concentrated water outlet communicates to the second-stage concentrated water washing unit through a concentrated water pipeline; and a purified water heat exchanger is disposed on the purified water pipeline, the first high-temperature condensed liquid tank conducts heat exchange by the purified water heat exchanger through a high-temperature condensed liquid pipeline, a concentrated water heat exchanger is disposed on the concentrated water pipeline, and the first high-temperature condensed liquid tank conducts heat exchange by the concentrated water heat exchanger through a second high-temperature condensed liquid pipeline.

2. The treatment system for improving the water quality of a dehydration tower in a purified terephthalic acid device according to claim 1, wherein the tail gas condensation device comprises a first oxidized tail gas condensation system comprising one or more stages of the oxidized tail gas condensers that communicate in sequence and a second oxidized tail gas condensation system located downstream of the first oxidized tail gas condensation system and comprising one or more further stages of the oxidized tail gas condensers that communicate in sequence, each stage of the one or more stages of the oxidized tail gas condensers in the first oxidized tail gas condensation system communicates to the first high-temperature condensed liquid tank for containing the first condensed liquid obtained after heat exchange by the one or more stages of oxidized tail gas condensers in the system, and each stage of the one or more further stages of the oxidized tail gas condenser in the second oxidized tail gas condensation system communicates to the second condensed liquid tank for containing the second condensed liquid obtained after the heat exchange by the oxidized tail gas condensers in the system.

3. The treatment system for improving the water quality of a dehydration tower in a purified terephthalic acid device according to claim 1, wherein the dehydration washing device is a dehydration washing tower, the bottom of the dehydration washing tower communicates with a purified terephthalic acid (PTA) oxidation reactor, and a concentrated reaction liquid after washing is returned to the oxidation reactor to continue to react.

4. The treatment system for improving the water quality of a dehydration tower in a purified terephthalic acid device according to claim 1, wherein the first-stage purified water washing unit, the second-stage concentrated water washing unit and the third-stage refined mother liquor washing unit are respectively provided with spray heads to wash tail gas by spraying.

5. The treatment system for improving the water quality of a dehydration tower in a purified terephthalic acid device according to claim 2, wherein the first oxidized tail gas condensation system comprises 1-4 stages of oxidized tail gas condensers, and/or the second oxidized tail gas condensation system comprises 1-4 stages of oxidized tail gas condensers.

6. The treatment system for improving the water quality of a dehydration tower in a purified terephthalic acid device according to claim 1, wherein the water separation device is a water separation tower, the multi-effect evaporation units for purifying the second condensed liquid are disposed in a tower body, a final-effect condensation unit is disposed below the multi-effect evaporation units, and a vacuum pump is connected to the bottom of the final-effect condensation unit.

7. The treatment system for improving the water quality of a dehydration tower in a purified terephthalic acid device according to claim 6, wherein:

the first-effect evaporation unit comprises a second condensed liquid inlet and a first heat exchange chamber, an upper portion of the first heat exchange chamber is connected with a first vapor passage for a vapor phase to enter the second-effect evaporation unit and a first downcomer for a liquid phase to flow to the second-effect evaporation unit, and the bottom of the first downcomer is provided with a first device;

the second-effect evaporation unit comprises a second heat exchange chamber, an upper portion of the second heat exchange chamber is provided with a second vapor passage for a vapor phase to pass through after a heat exchange with condensed water and a second downcomer for a liquid phase to pass through, and the bottom of the second downcomer is provided with a second device;

a lower portion of the second heat exchange chamber is provided with a first condensed liquid channel for the condensed water to flow out of the second heat exchange chamber after the heat exchange, and the bottom of the first condensed liquid channel is provided with a first U-shaped tube;

and the first device is located between the second heat exchange chamber and a second demister.

8. A method for improving the water quality of a dehydration tower in a purified terephthalic acid device according to claim 1, the method comprising the following steps:

1) introducing, after reaction tail gas comes out from the bottom of an oxidation reactor, the reaction tail gas into a lower portion of the third-stage refined mother liquor washing unit, enabling the reaction tail gas to firstly pass sequentially through the third-stage refined mother liquor washing unit to be subjected to spray washing with a refined mother liquor, the second-stage concentrated water washing unit to be subjected to spray washing with concentrated watery and the first-stage purified water washing unit to be subjected to spray washing with purified water;

2) enabling, after the reaction tail gas washed with the dehydration washing device comes out from a top of the tail gas condensation device, the reaction tail gas to firstly enter a first oxidized tail gas condensation system to form the first condensed liquid, which flows into the first high-temperature condensed liquid tank through a pipeline; and after a portion of the reaction tail gas is condensed through the first oxidized tail gas condensation system, enabling a remaining uncondensed portion of the reaction tail gas to enter a second oxidized tail gas condensation system to form the second condensed liquid, then enabling the second condensed liquid to enter the second condensed liquid tank through a pipeline, and discharging vapor that is not condensed;

3) enabling the second condensed liquid to enter a water separation tower to be continuously separated and purified via the following sub-steps:

turning on a vacuum pump located at the bottom of the water separation tower, enabling the second condensed liquid to enter a first heat exchange chamber of the first-effect evaporation unit from a second condensed liquid inlet to be partially evaporated, enabling the second vapor to enter a pipeline in the first heat exchange chamber from the second vapor pipeline, enabling the second vapor and the second condensed liquid to exchange heat in the first heat exchange chamber, enabling a further part of the second condensed liquid to be volatilized and enter a first vapor passage upwards as a first-effect vapor, enabling the first-effect vapor to enter a pipeline in the second-effect evaporation unit through the first vapor passage to continue to be used as a heat source to exchange heat with a remaining liquid phase of the second condensed liquid flowing out of a first downcomer, enabling heat of the first-effect vapor to flow to the remaining liquid phase of the second condensed liquid, enabling the first-effect vapor to be cooled and condensed to form condensed water that flows out of a first condensed liquid channel, enabling a part of the condensed liquid water to be gathered in a first U-shaped tube and finally flow to a purified water storage area at the bottom of the water separation tower; and enabling a part of the second condensed liquid that is not evaporated to enter the first downcomer and then enter the second-effect evaporation unit to continue to be evaporated or stay at a first device, wherein the water separation device is the water separation tower; and 4) after separation and purification of the second condensed liquid in step 3, discharging purified water from a purified water outlet of the purified water storage area through the purified water pipeline, exchanging heat through the purified water heat exchanger disposed on the purified water pipeline to increase the temperature of the purified water, and then spraying the reaction tail gas with the purified water as a washing liquid of the first-stage purified water washing unit; and discharging the concentrated water from the concentrated water outlet through the concentrated water pipeline, and performing spray washing on the reaction tail gas with the concentrated water as a washing liquid of the second-stage concentrated water washing unit.

\* \* \* \* \*